(12) United States Patent
Oosaki

(10) Patent No.: US 8,970,923 B2
(45) Date of Patent: Mar. 3, 2015

(54) SCANNING DEVICE

(71) Applicant: Masayoshi Oosaki, Aichi (JP)

(72) Inventor: Masayoshi Oosaki, Aichi (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/219,635

(22) Filed: Mar. 19, 2014

(65) Prior Publication Data

US 2014/0300938 A1  Oct. 9, 2014

(30) Foreign Application Priority Data

Apr. 8, 2013  (JP) ................. 2013-080215

(51) Int. Cl.
  *H04N 1/04* (2006.01)
  *H04N 1/00* (2006.01)
(52) U.S. Cl.
  CPC ............... *H04N 1/00655* (2013.01)
  USPC ............ 358/474; 358/498; 382/313
(58) Field of Classification Search
  CPC .......... H04N 2201/0081; H04N 1/00002; H04N 1/00013; H04N 1/00018; H04N 1/00029; H04N 1/0005; H04N 1/00063; H04N 1/00071; H04N 1/00241; H04N 1/00689; H04N 1/00708; H04N 1/00732; H04N 1/00734
  USPC ......... 358/474, 1.14, 1.15, 400, 497, 1.1, 1.2, 358/3.26, 448, 449, 451, 482, 483, 486, 358/488, 498, 513
  See application file for complete search history.

(56) References Cited

U.S. PATENT DOCUMENTS

| | | | | |
|---|---|---|---|---|
| 5,033,095 | A * | 7/1991 | Marcantonio | 382/112 |
| 7,139,108 | B2 * | 11/2006 | Andersen et al. | 358/474 |
| 7,643,050 | B2 * | 1/2010 | Nakagawa | 347/239 |
| 7,817,314 | B2 * | 10/2010 | Hashimoto | 358/498 |
| 8,284,465 | B2 * | 10/2012 | Ishikawa | 358/498 |
| 8,345,287 | B2 * | 1/2013 | Mizumukai | 358/1.15 |
| 8,432,583 | B2 * | 4/2013 | Hayashi | 358/3.26 |
| 8,451,516 | B2 * | 5/2013 | Chen | 358/497 |
| 8,456,715 | B2 * | 6/2013 | Watanabe et al. | 358/474 |
| 8,810,818 | B2 * | 8/2014 | Ueno et al. | 358/1.13 |
| 2001/0012124 | A1 | 8/2001 | Morikawa | |
| 2005/0073727 | A1 * | 4/2005 | Park et al. | 358/494 |

FOREIGN PATENT DOCUMENTS

| | | |
|---|---|---|
| JP | 10-313378 A | 11/1998 |
| JP | 2006-33675 A | 2/2006 |
| JP | 2007-266913 A | 10/2007 |
| JP | 2009-94944 A | 4/2009 |

\* cited by examiner

*Primary Examiner* — Negussie Worku
(74) *Attorney, Agent, or Firm* — Merchant & Gould PC

(57) ABSTRACT

A scanning device has a controller which is configured to judge whether the scanning device is to be operated in a conveyed sheet scanning mode in which the controller controls a conveying unit to convey a sheet and control the scanning unit to scan images on the sheet being conveyed, or in a held sheet scanning mode in which the sheet stationarily held by a sheet table is scanned, to display functions related to the conveyed sheet scanning mode on a display unit in a first prioritized manner when the controller judges that the scanning device is to be operated in the conveyed sheet scanning mode, and to display functions related to the held sheet scanning mode on the display unit in a second prioritized manner when the controller judges that the scanning device is to be operated in the held sheet scanning mode.

10 Claims, 13 Drawing Sheets

SCANNING DEVICE

CROSS-REFERENCE TO RELATED APPLICATION

This application claims priority under 35 U.S.C. §119 from Japanese Patent Applications No. 2013-080215 filed on Apr. 8, 2013. The entire subject matter of the application is incorporated herein by reference.

The present invention relates to a scanning device of which functions related to scanning original sheets can be selected by a user.

Conventionally, there are known scanning devices which are configured such that icons representing functions related to scanning of the original sheets are displayed on a display unit thereof. Typically, in such a conventional scanning device, a plurality of icons respectively corresponding to user-selectable functions of sheet scanning operation are displayed. When the user selects one of such icons to designate a function, a scanning operation of the original sheets corresponding to the selected icon is executed.

SUMMARY

Incidentally, there are known a scanning devices which is operable anyone of a plurality of operation modes such as a mode in which a stationary scanning unit scans an image formed on an original sheet which is being conveyed to pass over the scanning unit and a mode in which a scanning unit moves to scan an entire image formed on an original sheet which is placed on a platen or the like.

In such a type of scanning device, a user can select displayed icons which represent functions the user intend to use by touching the same from among the displayed icons. When the icons represent functions which are available in the selected scanning mode, the icons touched by the user are selected. However, when the user touches icons representing functions which cannot be used in the selected scanning mode, they cannot be selected. Therefore, the user is required to recognize in advance that which icons can be or cannot be selected in the currently selected scanning mode, and which makes it difficult for use to select functions regarding scanning of sheets.

In consideration of the above, aspects of the present invention provided technique which enables a user to select functions relatively easily in comparison with conventional art.

According to aspects of the invention, there is provided a scanning device, which has a sheet tray configured to hold sheets, a conveying unit configured to convey the sheet held by the sheet tray, a scanning unit configured to scan an image on a sheet, a sheet table configured to hold a sheet placed thereon, a display unit and a controller.

The controller may be configured to judge whether the scanning device is to be operated in a conveyed sheet scanning mode in which the controller controls the conveying unit to convey the sheet and control the scanning unit to scan images on the sheet being conveyed, or in a held sheet scanning mode in which the sheet stationarily held by the sheet table is scanned, to display functions related to the conveyed sheet scanning mode on the display unit in a first prioritized manner over functions related to the held sheet scanning mode when the controller judges that the scanning device is to be operated in the conveyed sheet scanning mode, and to display functions related to the held sheet scanning mode on the display unit in a second prioritized manner over functions related to the conveyed sheet scanning mode when the controller judges that the scanning device is to be operated in the held sheet scanning mode.

According to the above configuration, the user can recognize functions displayed in a prioritized manner can be selected and functions displayed in a non-prioritized manner cannot be selected in each of the conveyed sheet scanning mode and the held sheet scanning mode. It is noted that, in this specification, the term "prioritize" is intended to have a relatively broad meaning and include any type of distinctions in displaying which enables the user to recognize selectable/non-selectable items.

BRIEF DESCRIPTION OF THE ACCOMPANYING DRAWINGS

FIG. 1 is a perspective view of a scanning device according to a first embodiment of the invention when a original sheet conveying unit is opened.

FIG. 2 schematically shows a cross-sectional view of the scanning device according to the aspects of the invention.

FIG. 3 schematically shows a block diagram illustrating an electrical configuration of the scanning device according to embodiments of the invention.

DETAILED DESCRIPTION OF THE EMBODIMENTS

<External Configuration of Scanning Device>

Hereinafter, embodiments according to aspects of the invention will be described with referring to the accompanying drawings. The embodiments will be described in reference to an MFP (multi-function peripheral) 1 which can serve as a scanning device. According to the embodiments, the MFP 1 is configured to serve as a printer, a scanner, a copier, and a facsimile machine.

It is noted that various connections are set forth between elements in the following description. It is noted that these connections in general and, unless specified otherwise, may be direct or indirect and that this specification is not intended to be limiting in this respect. Further, directions (i.e., up, down, right, left, front and rear) referred to in the following description correspond to the same indicated in FIGS. 1 and 2.

Figure 1:
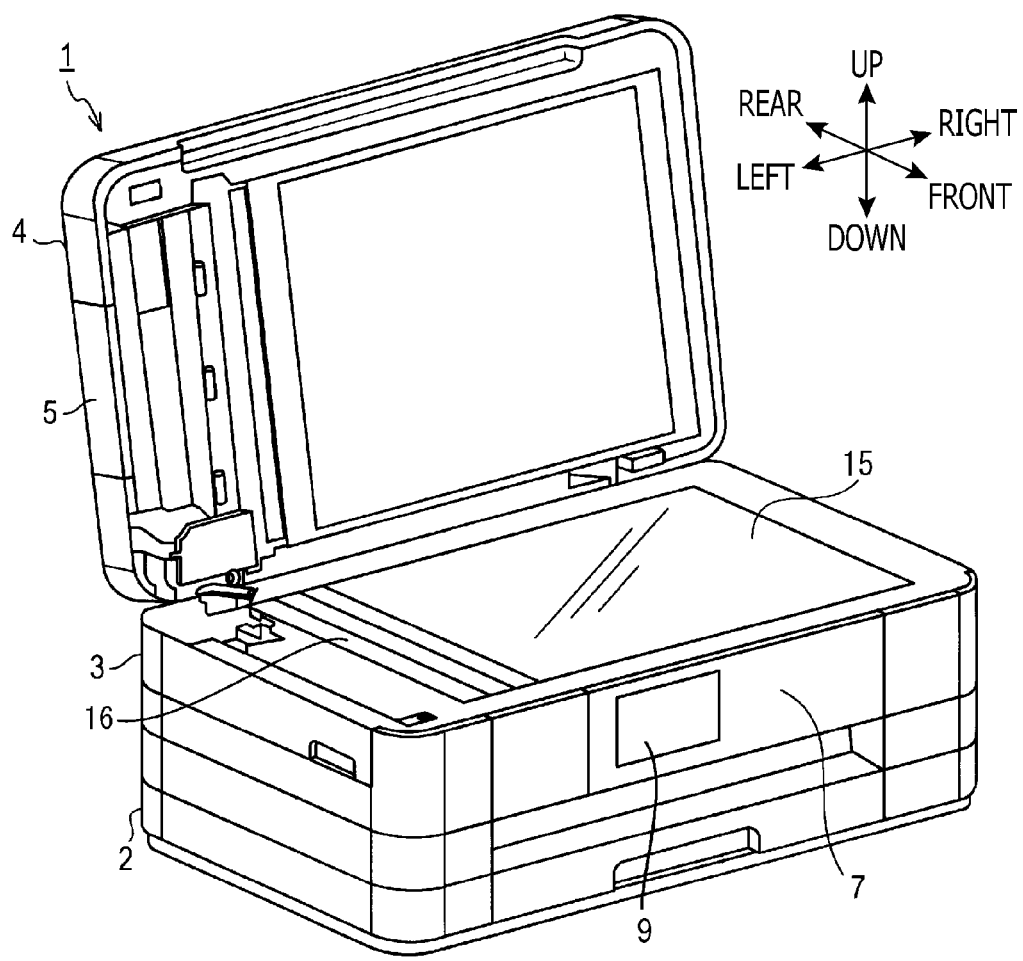

As shown in FIG. 1, the MFP 1 has a main unit 2, a scanner unit 3, a sheet conveying unit 4, which are mounted from bottom to top in this order.

The MFP 1 further has an operation unit 7 which is provided with a touch panel, a start key, a clear key and the like, through which operations/commands by the user can be input, and a display unit 9 which has an LED (light emitting diodes) and an LCD (liquid crystal display) and displays an operational status of the MFP 1. The touch panel is arranged on a display area of the display unit 9. When the user touches an image displayed within the display area of the display unit 9, the touch panel can detect the touch of the user, thereby user's operations can be acquired.

The scanner unit 3 is arranged to cover an entire area of an upper surface of the main unit 2. The scanner unit 3 is configured to be rotatable, with respect to the main unit 2, about an rotation axis defined at a rear end of the main unit 2. The scanner unit 3 has a first scanning unit 21 (see FIG. 2) and first platen glass 15 and a second platen glass 16, each of which is made of transparent glass plate on an upper surface of the scanning unit 3.

The sheet conveying unit 4 is arranged to cover an entire area of the upper surface of the scanner unit 3. The sheet conveying unit 4 is configured to be rotatable, with respect to the scanner unit 3, about an rotation axis defined at a rear end of the scanner unit 3. The sheet conveying unit 4 can be rotated to displace between a closed position at which the sheet conveying unit 4 is closed with respect to the scanner unit 3, and an open position (see FIG. 1) at which the sheet conveying unit 4 is opened (i.e., spaced from the scanner unit 3 so as to expose the same.

Figure 2:
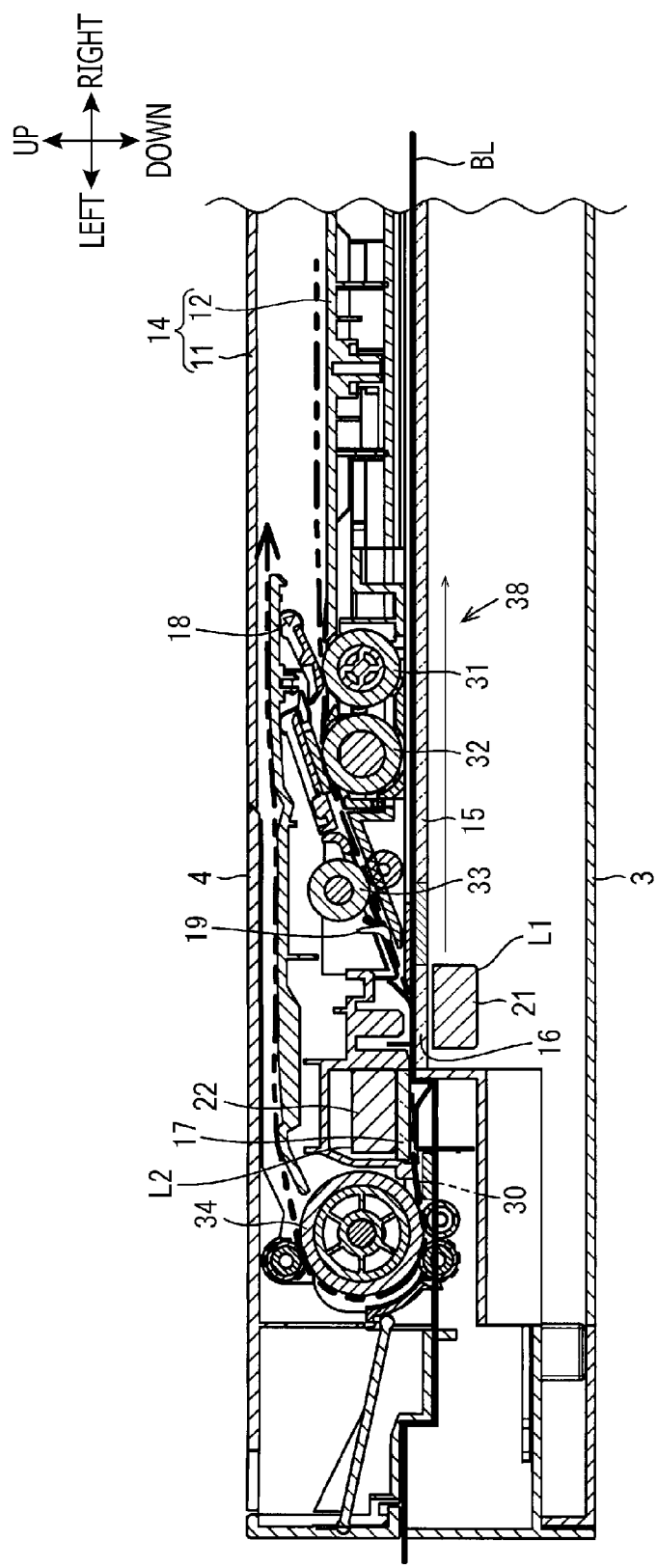

A line BL in FIG. 2 shows a boundary line. When the sheet conveying unit 4 moves from the closed position (as shown in FIG. 2) to the open position, a portion on the upper side of the boundary line BL displaced to move away from a portion on the lower side of the boundary line BL. When the sheet conveying unit 4 displaced toward the open position, the first platen glass 15 provided on the upper surface of the scanner unit 3 is exposed to outside, and enables the user to place an original sheet on the first platen glass 15. Thereafter, when the sheet conveying unit 4 is returned to the closed position, the first platen glass 15 is covered with the sheet conveying unit 4 with the original sheet located therebetween.

The sheet conveying unit 4 has a conveying section 38 which is configured to convey original sheets along a sheet conveying path 30, a cover member 5, and an upper cover 11. The upper cover 11 is configured to be displaceable between an open position and a close position. When the upper cover 11 is moved to the open position, a sheet feed table 12 which holds a sheet is exposed to outside. Further, by displacing the upper cover 11 to the open position, a back surface thereof, which faces downward when the upper cover 11 is closed, is oriented upward, thereby a sheet supply tray 14 is formed by the back surface of the upper cover 11 located at the open position and the sheet feed table 12.

Figure 3:
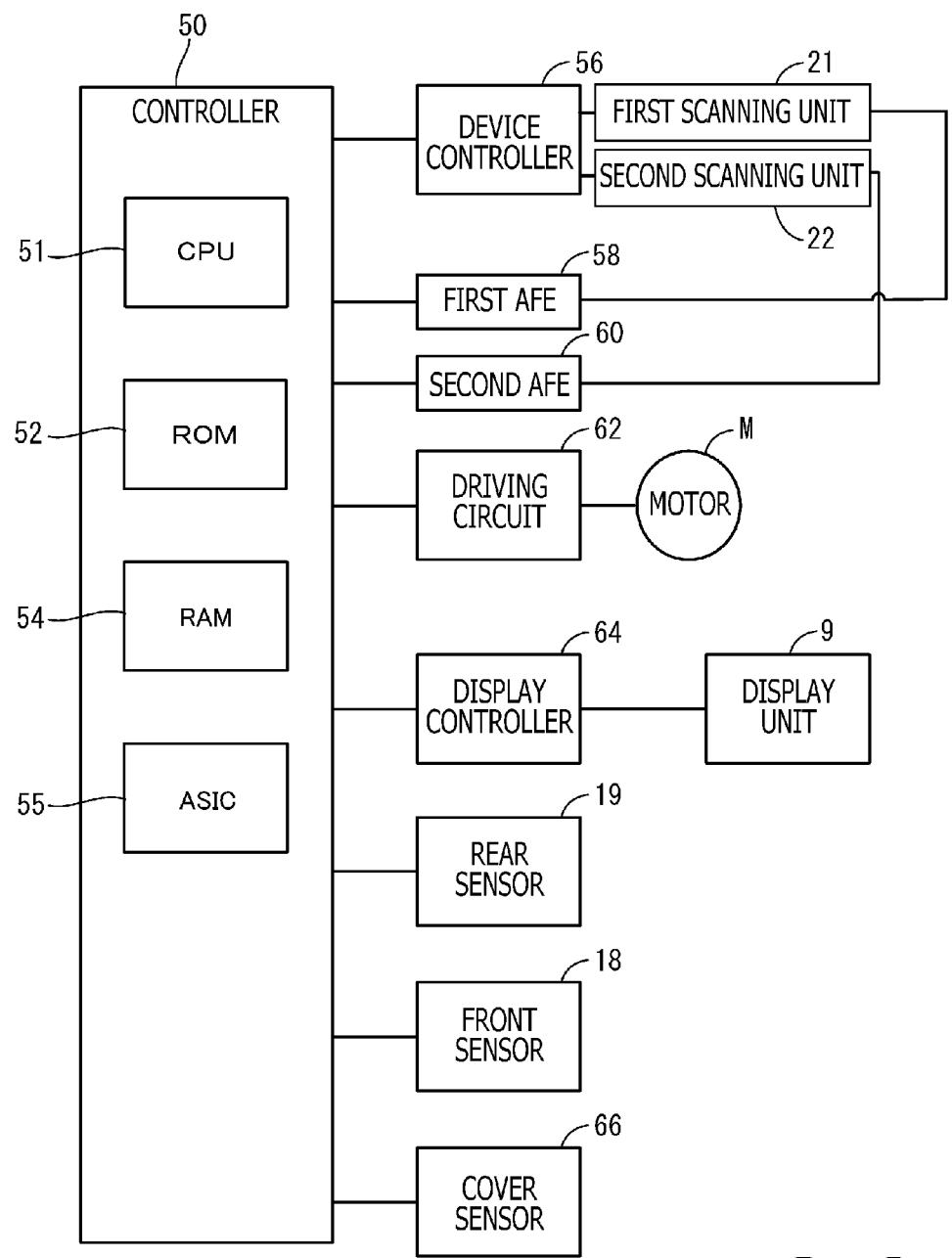

As shown in FIGS. 2 and 3, the sheet conveying unit 4 has a front sensor 18 which includes a photo sensor or the like and outputs a signal based on absence/presence of original sheets in the sheet supply tray 14. According to the embodiments, the front sensor 18 outputs an ON signal when it detects the sheet(s) held in the sheet supply tray 14.

Further, the sheet conveying unit 4 also has a rear sensor 19 which includes a photo sensor or the like and outputs a signal based on absence/presence of a sheet in the sheet conveying path 30. According to the embodiments, the rear sensor 19 outputs an ON signal when it detects the sheet in the sheet conveying path 30.

The sheet conveying unit 4 further includes a second scanning unit 22, a third platen glass 17 formed with a transparent glass plate, a pick-up roller 31, a sheet supply roller 32, a first conveying roller 33, a second conveying roller 34 and the like. With these rollers, a sheet conveying unit 38, which conveys the sheets held by the sheet supply tray 14 one by one along the sheet path 30, is configured.

The sheet path 30 as described above is defined in the sheet conveying unit 4, and the first scanning unit 21 and the second scanning unit 22 are arranged adjacent to the sheet path 30.

Specifically, the first scanning unit 21 is arranged inside the scanner unit 3, and extends in a main scanning direction, or in a front-and-rear direction in FIGS. 1 and 2. The first scanning unit 21 is movably supported below the first platen glass 15 such that the first scanning unit 21 is movable in an auxiliary scanning direction, or a right-and-left direction. With this configuration, the first scanning unit 21 is capable of scanning the original sheet which is placed stationarily on the first platen glass 15 while moving in the auxiliary scanning direction. The first scanning unit 21 also operates to stay at a scanning position L1 defined below the second platen glass 16 and scan the sheet passing over the second platen glass 16 as is conveyed through the sheet path 30.

The second scanning unit 22 is supported at a scanning position L2 defined inside the sheet conveying unit 4. The second scanning unit 22 scans the sheet when the sheet conveyed along the sheet path 30 passes over the third platen glass 17.

As above, the MFP 1 has a plurality of scanning modes, which include a mode where the first scanning unit 21 is moved to scan the stationary sheet placed on the first platen glass 15 (which will be referred to an FB scanning mode) and a mode where images on the sheet conveyed by the conveying unit 38 are scanned with use of the first scanning unit 21 and the second scanning unit 22 (which will be referred to as an ADF scanning mode).

<Electrical Configuration of MFP>

The MFP 1 has, as shown in FIG. 3, a controller 50, a device controller 56, a first AFE (analog front end) 58, a second AFE 60, a driving circuit 62, to which a display controller 64, the display unit 9, the operation unit 7, the rear sensor 19, the front sensor 18 and a cover sensor 66 are connected through a bus. Since the electrical connection using the bus is well-known, the bus is not shown in FIG. 3 for brevity.

The controller 50 includes a CPU (central processing unit) 51, a ROM (read only memory) 52, a RAM (random access memory) 54, and an ASIC (application specific integrated circuit) 55. The CPU 51 executes programs stored in the ROM 52 and/or RAM 54 and controls various components of the MFP 1. The ROM 52 stores various programs which are executed by the CPU 51 to control operations of the MFP 1. The RAM 54 is basically used as a storage device to store data and programs when the controller 50 executes various operations.

The controller 50 stores setting information regarding the FB scanning mode, setting information regarding the ADF scanning mode, and setting information regarding selection result on a selection display (which will be described later) in the RAM 54. The setting information regarding the FB scanning mode includes an FB scanning flag indicating whether an original sheet is placed on the first platen glass 15. The setting information regarding the ADF scanning mode includes an ADF scanning flag indicating whether an original sheet is held in the sheet supply tray 14. The setting information regarding the selection results is information indicating whether a selection has been made in the selection display which will be described later.

The device controller 56 is connected to the first scanning unit 21 and the second scanning unit 22, and transmits scanning control signals to the first and second scanning units 21 and 22, respectively. The first and second scanning units 21 and 22 scans images on both sides of a sheet based on the scan control signals, respectively.

The first AFE 58 and the second AFE 60 are connected to the first scanning unit 21 and the second scanning unit 22, respectively, and converts scan data output by the first and second scanning units 21 and 22 in analog signal form to scan data in digital signal form. The first AFE 58 and the second AFE 60 respectively store the converted scan data in digital form in the RAM 54 through the bus. The driving circuit 62 is connected to a motor M and drives the motor M to rotate based on a pulse signal which is transmitted from the controller 50.

The display controller 64 is connected to the display unit 9, and transmits a display control signal to the display unit 9 based on instructions from the controller 50. The display controller 64 also receives signals regarding user's operation which is acquired by the display unit 9, and transmits the same to the controller 50.

The cover sensor 66 outputs a signal based on open/close status of the sheet conveying unit 4. Specifically, the cover sensor 66 is turned ON when the sheet conveying unit 4 is in the open state. In this scanning device 1, when an original sheet is placed on the first platen glass 15, the sheet conveying unit 4 is once opened and the cover sensor 66 is turned ON. Then, after the original sheet is placed on the platen glass 15, the sheet conveying unit 4 is closed and the cover sensor 66 is turned OFF.

<Display Switching Process>

Hereafter, various embodiments regarding the display switching process will be described. It is noted that the display switching process is a process executed, after the MFP 1 is powered ON, by the controller 50 based on the program stored in the ROM 52. Specifically, the display switching process is a process in which the controller 50 switches contents displayed on the display unit 9 depending on presence/absence of sheets on the first platen glass 15 and in the sheet supply tray 14.

<First Embodiment>

Figure 4:
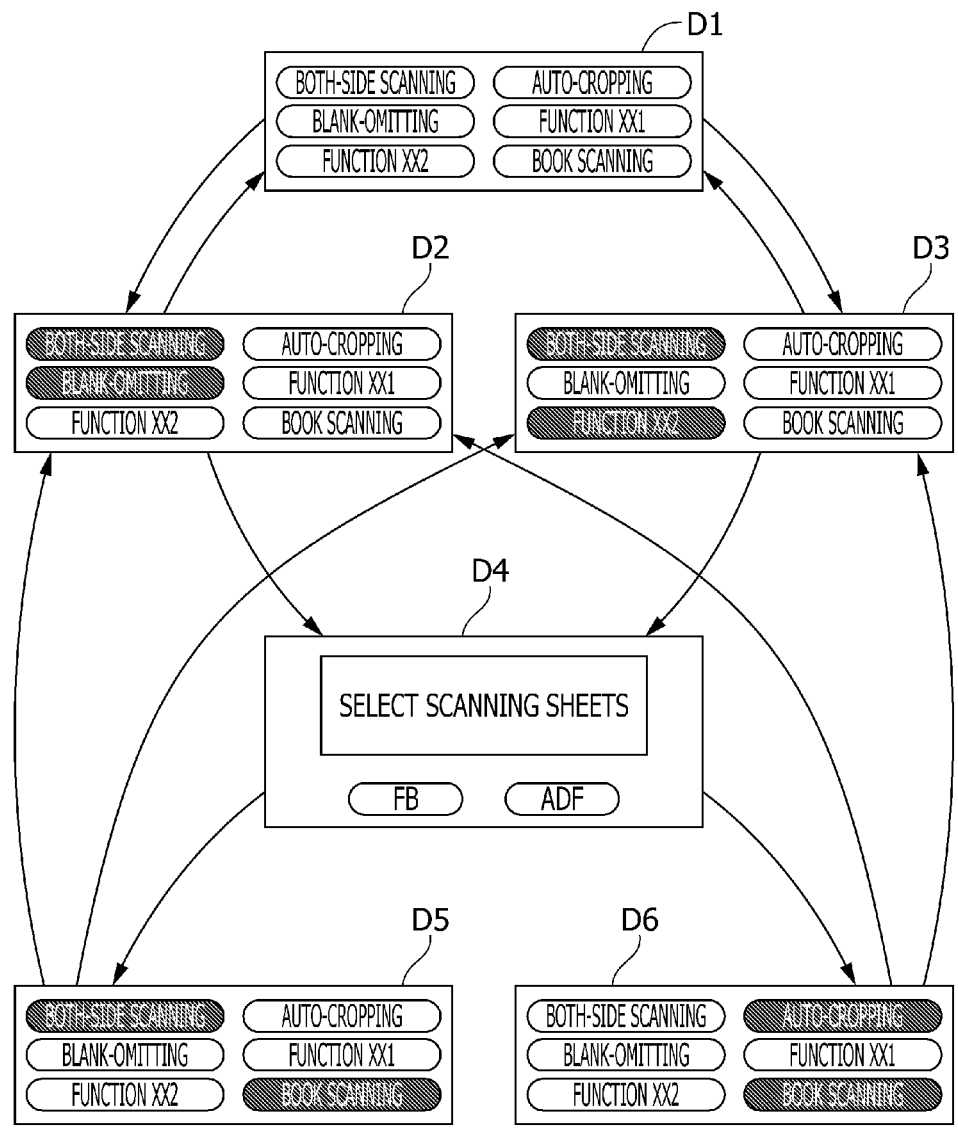
FIG. 4 is a chart showing transition of a status of a display unit according to the first embodiment of the invention.

FIG. 4 is a chart showing transition of contents displayed on the display unit 9 according to the first embodiment of the invention. On the display unit 9, based on the instructions from the controller 50, a plurality of items representing a plurality of functions (e.g., Auto-Cropping function and Book Scanning function) related to the FB scanning (hereinafter, referred to as FB scanning items) and a plurality of items representing a plurality of functions (e.g., Both-Side Scanning function, Blank Omitting function) related to the ADF scanning (hereinafter, referred to as ADF scanning items) are displayed. Further, in the following description, a plurality of FB scanning items will occasionally be referred to as an FB scanning item set, and a plurality of ADF scanning items will occasionally be referred to as an ADF scanning items set merely for simplifying the description.

It is noted that the Auto-Crop function is a function to extract scan data representing an area of the original sheet from the scan data. The Book Scanning function is a function to reduce density of black portions which appear when a book pages are scanned. The Blank-Omitting function is a function to discard scan data as the scan data does not include any images if the scan data includes only a predetermined number of non-blank pixels or less.

In FIG. 4, a display D1 shows an initial display of items displayed on the display unit 9 when the MFP 1 is turned ON and the scanning mode is selected.

In the initial display D1, all the items including the ADF scanning items and FB scanning items are displayed. In this state, if the user touch one of the items on the display 9, the touch panel acquires the user's touch, which is transmitted to the controller 50 via the display controller 64, and the controller 50 executes a function corresponding to the item touched (i.e., selected) by the user.

Figure 5:
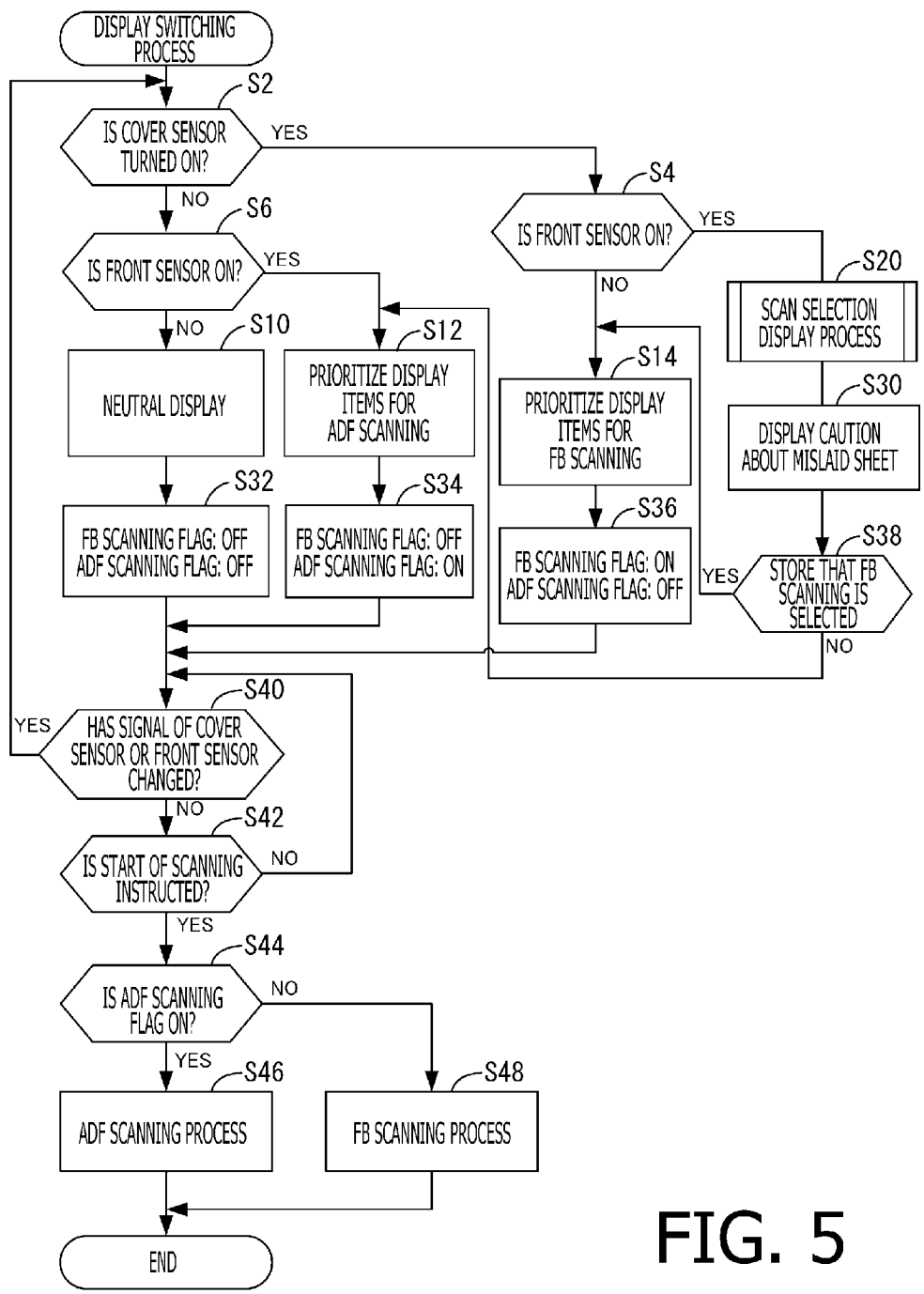
FIG. 5 is a flowchart illustrating a display switching process according to the first embodiment of the invention.

Next, referring to FIG. 5, the display switching process according to the first embodiment will be described.

When the user has turned ON the MFP 1, the controller 50 judges whether the cover sensor 66 is turned ON (S2).

If the sheet conveying unit 4 has been opened, and then closed after the original sheet has been placed on the glass plate 15, the cover sensor 66 has been turned OFF and then turned ON. Therefore, by judging whether the cover sensor 66 has been turned ON, the controller 50 can judge whether the original sheet is currently placed on the first platen glass 15. In the following description, a status where an original sheet is being placed on the glass plate 15 will be referred to such that an original sheet is set to an FB side.

When the controller 50 judges that the cover sensor 66 has been turned ON (S2: YES), it proceeds to S4. When the cover sensor 66 has not been turned ON (S2: NO), the controller 50 proceeds to S6.

In S4, the controller 50 judges whether the front sensor 18 is ON. By judging whether the front sensor 18 is ON or OFF, the controller 50 can judge whether the original sheets are held on the sheet supply tray 14 or not. In the following description, a status where the sheet supply tray 14 holds the sheets will be referred to such that the original sheets are set to an ADF side.

When the judgment of the controller 50 indicates that the front sensor 18 is ON (S4: YES), the original sheets are set to both the FB side and the ADF side. In such a case, a scan selection display process, which will be described later, is executed. When the controller 50 judges that the front sensor is not ON (S4: NO), the original sheet is set only to the FB side. In this case, the controller proceeds to S14.

In S6, the controller 50 judges whether the front sensor 18 is ON. When the controller 50 judges that the front sensor 18 is ON (S6: YES), the original sheets are set only to the ADF side. In this case, the controller 50 proceeds to S12. When the controller 50 judges that the front sensor 18 is not ON (S6: NO), the original sheets are not set to FB side or ADF side. In this case, the controller 50 proceeds to S10.

In S12, the controller 50 shows the ADF scanning items on the display unit 9 as shown in display D3 of FIG. 4 to show that the ADF items can acquire user's designation, while the FB scanning items are shown as grayed out items to show that the FB scanning items cannot acquire user's designation operations. Thereafter, the controller 50 proceeds to S34. When the items are shown as grayed out items, the FB scanning items may be displayed to have a color close to the background color of the display unit 9, or closer to black. By decreasing the visibility of the FB scanning items as described above, the user can easily recognize that the FB scanning items do not acquire the user's designation.

In S34, the controller 50 sets the FB scanning flag to "OFF," the ADF scanning flag to "ON" and stores the FB scanning flag and the ADF scanning flag in the RAM 54. Then, the controller 50 proceeds to S40.

In S14, the controller 50 shows the FB scanning items on the display unit 9 as shown in display D2 of FIG. 4 to show that the FB items can acquire user's designation, while the ADF scanning items are shown as grayed out items to show that the ADF scanning items cannot acquire user's designation operations. Then, the controller 50 proceeds to S36.

Thus, in S14, the display on the display unit 9 is changed from the display D1 to the display D2 of FIG. 4.

In S36, the controller 50 sets the FB scanning flag to "ON," the ADF scanning flag to "OFF" and stores the FB scanning flag and the ADF scanning flag in the RAM 54. Then, the controller 50 proceeds to S40.

After the controller 50 has finished the scan selection display process (described later) at S20, the controller 50 displays a caution indicating that there are mislaid sheets on the display unit 9 (S30), and proceeds to S38.

It is noted that, if the original sheets are set to both of the FB side and the ADF side, it is highly possible that the user has left the original sheets at one of the FB side and the ADF side. Therefore, it would be convenient for the user that the above caution is displayed on the display unit 9.

In S38, the controller 50 judges whether information representing that the FB scanning is selected or the ADF scanning is selected is stored in the RAM 54 during execution of the scan selection display process (described later). When the controller 50 judges that information representing that "FB scanning is selected" is stored (S38: YES), the controller 50 proceeds to S14. In this case, the indication of items shown in the display unit 9 is changes from display D4 to display D5 of FIG. 4. When the controller 50 judges that information representing that "ADF scanning is selected" is stored (S38: NO), the controller 50 proceeds to S12. In this case, the indication of items shown in the display unit 9 is changed from display D4 to display D6.

In S40, the controller 50 judges whether detection signal transmitted from the cover sensor 66 or the front sensor 18 has been changed. Specifically, regarding the cover sensor 66, the controller 50 judges that a setting status of the FB side sheets has been changed when the cover sensor 66 has been turned ON after the FB scanning flag and the ADF scanning flag are set in S32, S34 or S36. It is noted that, when the sheet set to the FB side has been removed, or a sheet is set to the FB side, the cover sensor 66 has been turned ON once. Therefore, by judging whether the cover sensor 66 has been turned ON or not, the controller 50 can judge whether the setting status of the sheet to the FB side has been changed.

Regarding the front sensor 18, when the detection signal transmitted from the front sensor 18 has been changed (i.e., an ON signal has been changed to an OFF signal, or an OFF signal has been change to an ON signal) after the FB scanning flag and the ADF scanning flag are set in S32, S34 or S36, the controller 50 judges that the sheets set to the ADF side has been changed. When the sheets set to the ADF side have been removed or sheets have been newly set to the ADF side, the detection signal of the front sensor 18 is changed. Therefore, by judging whether the detection signal of the front sensor 18 has been changed, the controller can judge whether the setting status of the sheets on the ADF side has been changed.

The controller 50 returns to S2 when it judges that the detection signal transmitted from the cover sensor 66 or the front sensor 18 has been changed (S40: YES). When the controller 50 judges that the detection signals transmitted from the cover sensor 66 and the front sensor 18 have not been changed (S40: NO), the controller 50 proceeds to S42.

In S42, the controller 50 judges whether an instruction to start scanning has been issued. Specifically, in S42, it is judged whether the controller 50 has acquired a signal representing start of scanning as the user selects a displayed item representing start of scanning from among the items displayed on the display unit 9.

When the controller 50 judges that the start of scanning has been instructed (S42: YES), it proceeds to S44. When the controller 50 judges that start of scanning has not been instructed (S42: NO), it returns to S40.

In S44, the control unit 50 retrieves setting information regarding the ADF scanning from the RAM 54, and judges whether the ADF scanning flag is set to "ON". When the ADF scanning flag is set to "ON" (S44: YES), the controller proceeds to S46.

When the controller 50 judges that the ADF scanning flag retrieved from the RAM 54 is set to "OFF" (S44: NO), the controller 50 proceeds to S48.

In S46, the controller 50 executes the ADF scanning and terminates the display switching process. In S48, the controller 50 executes the FB scanning process, and terminates the display switching process.

<Scan Selection Display Process>

Figure 6:
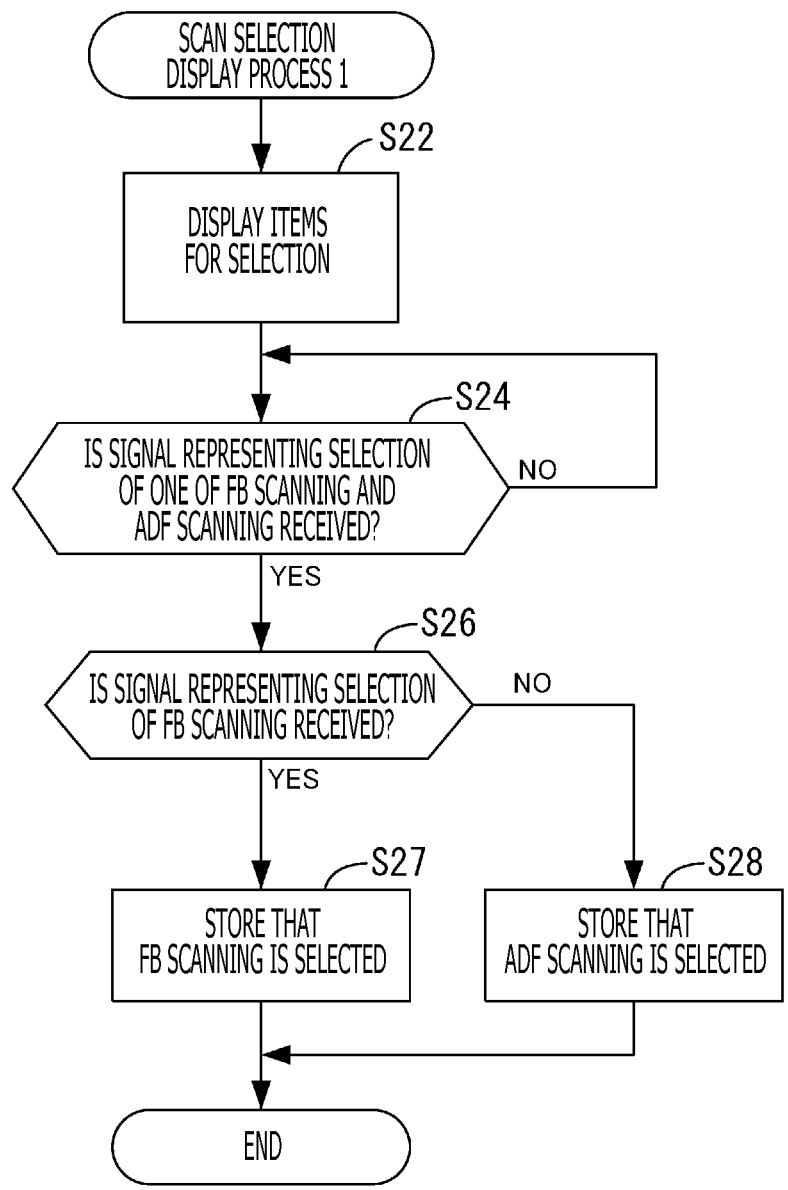
FIG. 6 is a flowchart illustrating a scan selection display process 1 according to the first embodiment of the invention.

FIG. 6 is a flowchart illustrating a scan selection display process 1 according to a first embodiment of the invention. In the scan selection display process, the controller 50 firstly displays (S22) indication to urge the user to select one of the FB scanning and the ADF scanning (D4 of FIG. 4). Then, the controller 50 proceeds to S24.

In S24, it is judged whether the controller 50 has received a signal indicating that one of the FB scanning and the ADF scanning has been selected by the user (i.e., whether the user has made a selection in the display D4). When it is judged that the controller 50 has not acquired the selection signal (S24: NO), the controller 50 repeats S24 until it is judged that a selection is made in the selection display D4. When the controller 50 judges that the selection signal has been received (S24: YES), the controller 50 proceeds to S26.

In S26, the controller 50 judges whether a signal indicating selection of the FB scanning has been received (i.e., whether the FB scanning is selected on the selection display D4). When the controller 50 judges that the signal indicating selection of the FB scanning (S26: YES), the controller 50 stores information indicating that the FB scanning has been selected in the RAM 54 (S27).

When the controller 50 judges that the signal indicating that the FB scanning is selected is not acquired, that is, a signal indicating that the ADF scanning is selected is received (S26: NO), the controller 50 stores information indicating selection of the ADF scanning in the RAM 54 (S28) and terminates the scan selection display process.

According to the MFP 1 described above, when the controller 50 judges that the original sheet is set to one of the FB side and the ADF side, the controller 50 determines whether the first scanning unit 21 and/or the second scanning unit 22 are driven, and which of the ADF scanning and the FB scanning is to be executed based on to which of the FB side and the ADF side the original sheet has been set. Then, based on the determination, the controller prioritizes one of the ADF scanning item set and the FB scanning item set with respect to the other in displaying the same on the display unit 9. In the above-described exemplary embodiment, the controller 50 prioritizes the ADF scanning items by displaying the FB scanning items in grayed out indication on the display unit 9, or prioritizes the FB scanning items by displaying the ADF scanning items in grayed out indication.

Accordingly, the user can recognize that the prioritized items (i.e., items which are not grayed out) are selectable items, while non-prioritized items (i.e., grayed out items) are non-selectable items. It is noted that, in this specification, the term "prioritize" is intended to have a relatively broad meaning and include any type of distinctions in displaying which enables the user to recognize selectable/non-selectable items.

According to the MFP 1 described above, the controller 50 displays one of the ADF scanning item set and the FB scanning item set in grayed out manner, which indicates that the grayed out items cannot be selected. Therefore, the user can easily recognize the items which cannot be selected, and thus, the user may not attempt to select a non-selectable item by mistake.

According to the MFP 1 described above, the controller 50 displays a caution when the original sheets are set both on the FB side and the ADF side in a manner different from a case where the one of the FB scanning item set and the ADF scanning item set is prioritized. Specifically, according to the embodiments, the controller 50 displays the caution depicted as D4 in FIG. 4. Further, the controller 50 may notify the user that the original sheets have not been removed after the scan selection display process is finished. Therefore, the user can recognize when there has been a change in the setting status of the original sheets on the FB side and the ADF side.

According to the embodiments, the controller 50 displays selection display D4 allowing the user to select one of the FB scanning item set and the ADF scanning item set when it is judged that the original sheets are set both to the FB side and the ADF side. Then, in accordance with the user's selection, the controller 50 determines which/both of the first and second scanning units 21 and 22 is used and which of the ADF scanning and the FB scanning is to be executed. Specifically, the controller 50 prioritizes one of the FB scanning item set and the ADF scanning item set then the other when displaying the same on the display unit 9 based on whether the RAM 54 stores the information representing that "FB scanning is selected" or "ADF scanning is selected". Therefore, the items are displayed on the display unit 9 with reflecting the user's intension precisely, and prioritizing the selectable items corresponding to the selected scanning, which improves convenience for the user.

According to the MFP 1 described above, the controller 50 detects whether the original sheet is set to the FB side using the cover sensor 66, and whether the original sheet is set to the ADF side using the front sensor 18. Therefore, the controller 50 can judge on which side the original sheet is set precisely and the user's intension can easily be reflected to the indication on the display unit 9.

<Modification of First Embodiment>

According to a modification of the first embodiment described above, the controller 50 releases the grayed out display of the FB scanning items when the user selects one of the FB scanning items which is grayed out, when a process proceeds from S12 to S42, and displays the ADF scanning items in grayed out manner.

Similarly, the controller 50 releases the grayed out display of the ADF scanning items when the user selects one of the ADF scanning items which are displayed in the grayed out manner, when a process proceeds from S14 to S42, and displays the FB scanning items in the grayed out manner.

According to the above modification of the first embodiment, when one of the FB scanning item set and the ADF scanning item set is displayed in the grayed out manner, and if the user selects one of the grayed out items, prioritization of the FB scanning item set and the ADF scanning item set is switched. According to such a modification, the items are displayed on the display unit 9 with reflecting the user's intension precisely and prioritizing the selectable items corresponding to the selected scanning, which improves convenience for the user.

<Second Embodiment>

Figure 7:
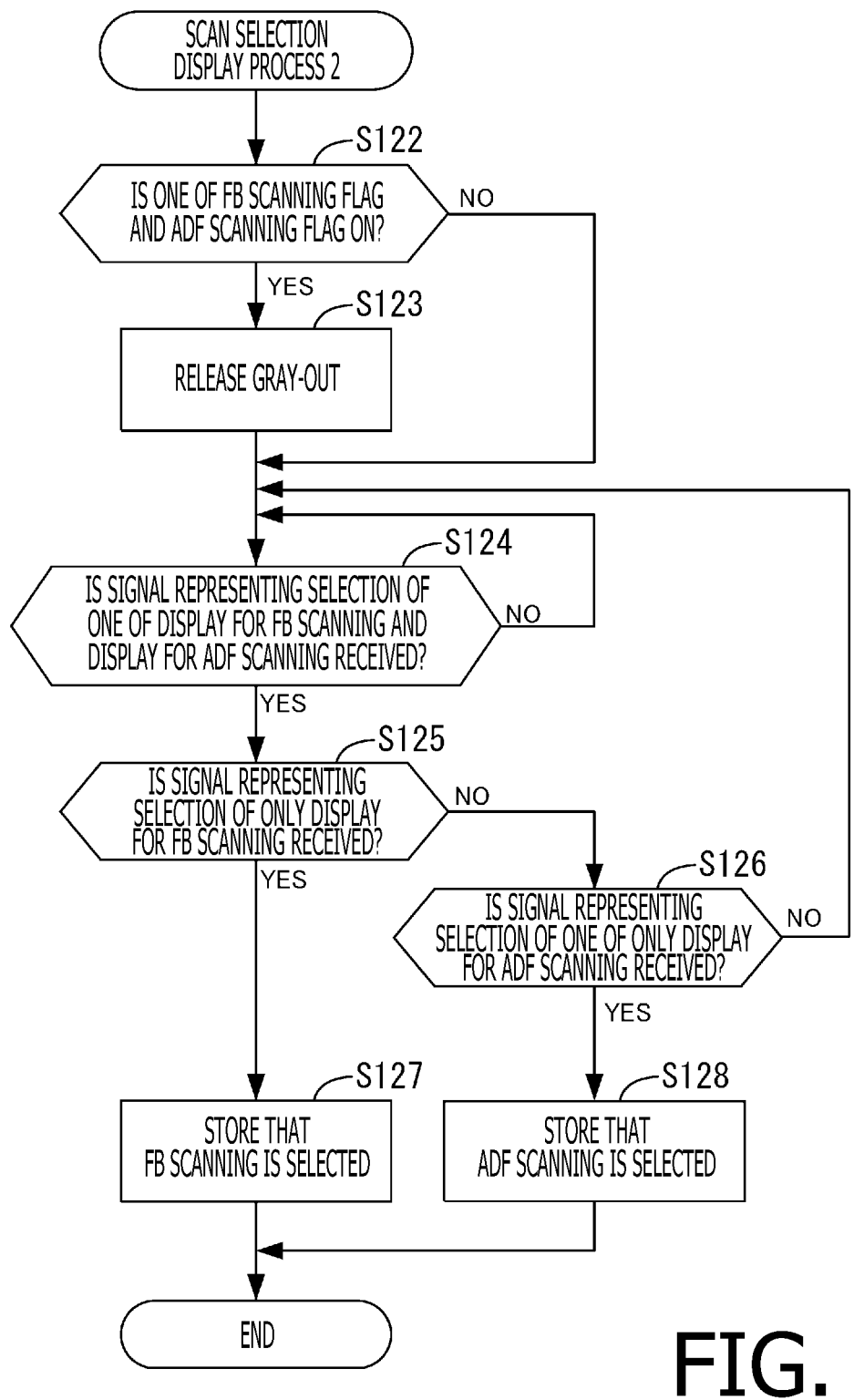
FIG. 7 is a flowchart illustrating a scan selection display process 2 according to a second embodiment of the invention.

A display switching process according to a second embodiment employs a scan selection display process 2 (see FIG. 7) instead of the scan selection process 1 employed in the first embodiment. The other steps are the same as those of the first embodiment, and description thereof will be omitted for brevity.

<Scan Selection Process 2>

In the scan selection process 2 (FIG. 7), the controller 50 judges whether one of the FB scanning item set and the ADF scanning item set is grayed out based on whether one of the FB scanning flag or the ADF scanning flag is ON (S122).

When both the FB scanning flag and the ADF scanning flag are ON (S122: YES), that is, when the controller 50 judges that one of the FB scanning item set and the ADF scanning item set is grayed out, the controller 50 releases the gray-out of the items (S123), and proceeds to S124. When it is judged that none of the FB scanning items and the ADF scanning items is grayed out, that is, both the FB scanning flag and the ADF flag are OFF (S122: NO), the controller 50 proceeds to S124.

In S124, the controller 50 judges whether a selection signal indicating selection of one of the FB scanning items and the ADF scanning items is transmitted from the operation unit 7, that is, one of the functions represented by the FB and ADF scanning items is selected on the display unit 9. When the controller 50 judges that no selection signal representing a selection of the FB and ADF scanning items has been received (S124: NO), the controller 50 executes S124 repeatedly. When it is judged that the selection signal representing selection of one of the FB scanning items and the ADF scanning items is received (S124: YES), the controller 50 proceeds to S125.

In S125, the controller 50 judges whether the item selected in S124 is an item included only in the FB scanning items (hereinafter, referred to as an FB-only item). When the controller 50 judges that the selected item is an FB-only item (S125: YES), the controller 50 stores selection information indicating that "FB scanning is selected" in the RAM 54 (S127) and terminates the scanning selection display process.

When the controller 50 judges that the selection signal representing that the FB-only item is selected has not been received (S125: NO), the controller 50 judges whether the selection signal representing that the item selected in S124 is an item included only in the ADF scanning items (hereinafter, referred to as an ADF-only item) (S126).

When the controller 50 judges that the selection signal representing selection of ADF-only item (S126: YES), the controller 50 stores selection information indicating that "ADF scanning is selected" in the RAM 54 (S128) and terminates the scanning selection display process. When the controller judges that the selection signal representing selection of the ADF-only item has not been received (S126: NO), the controller 50 returns to S124.

According to the second embodiment, when the original sheets are set to both the FB side and the ADF side, and when one of the FB scanning items and the ADF scanning items are grayed out, the controller 50 release the gray-out display, and displays the items in normal displaying condition.

Thereafter, when it is judged that the controller 50 has received a selection signal representing selection of one of the FB scanning items or the ADF scanning items, the controller 50 prioritize one of the FB scanning item set and the ADF scanning item set with respect to the other, depending on the selection, and displays the items on the display unit 9. Therefore, the items are displayed on the display unit 9 with reflecting the user's intension precisely and prioritizing the selectable items corresponding to the selected scanning, which improves convenience for the user.

<Third Embodiment>

A display switching process according to a third embodiment employs a scan selection display process 3 (see FIG. 8) instead of the scan selection process 1 employed in the first embodiment. The other steps are the same as those of the first embodiment, and description thereof will be omitted for brevity. It is noted that, according to the third embodiment, an FB precedence flag representing that the original sheet has been set to the FB side firstly and an ADF precedence flag representing that the original sheets have been set to the ADF side firstly. The ON/OFF status of the FB precedence flag and the ADF precedence flag are switched in a precedence setting process shown in FIG. 9.

<Scan Selection Display Process 3>

Figure 8:
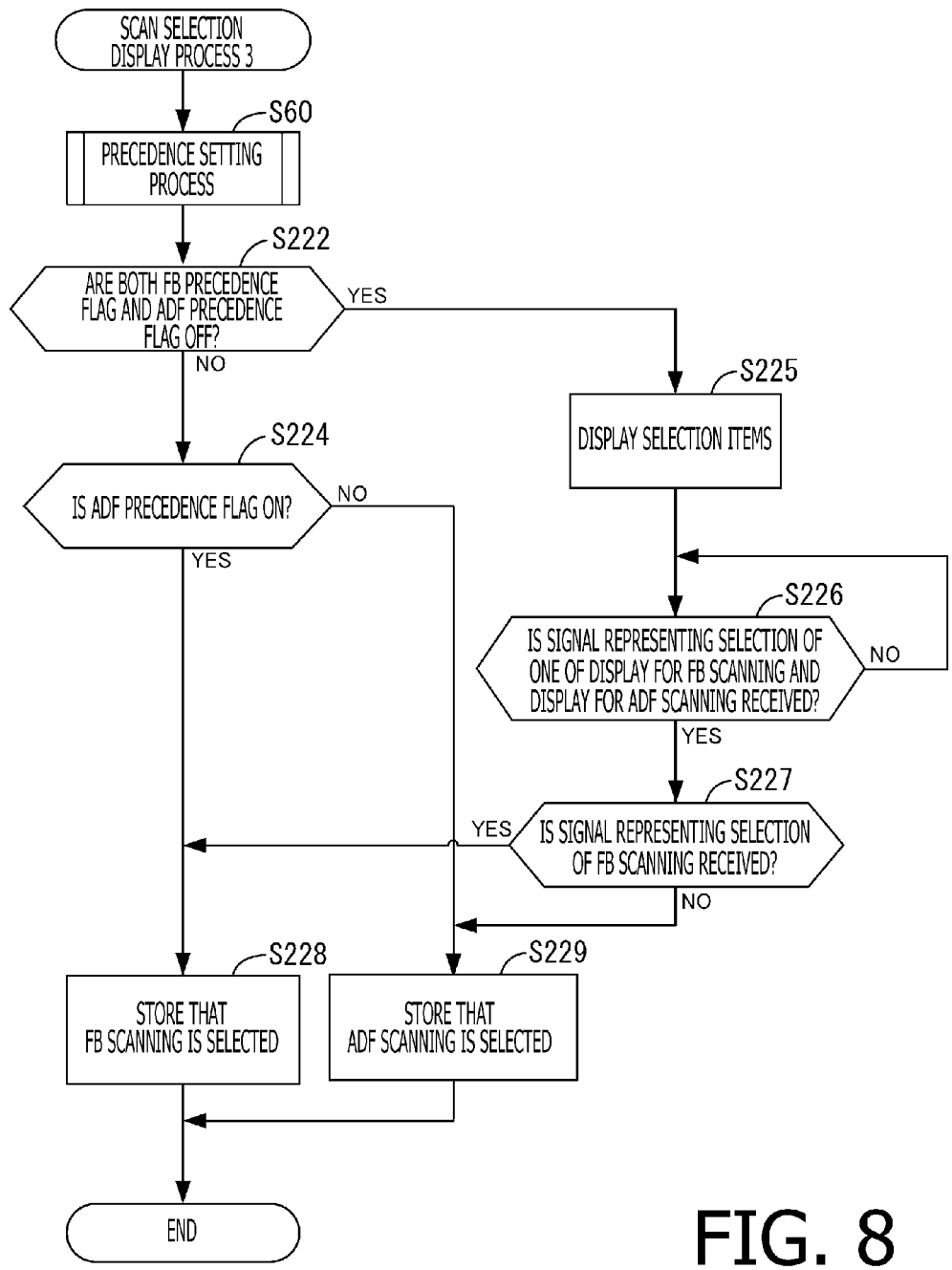
FIG. 8 is a flowchart illustrating a scan selection display process 3 according to a third embodiment of the invention.
Figure 9:
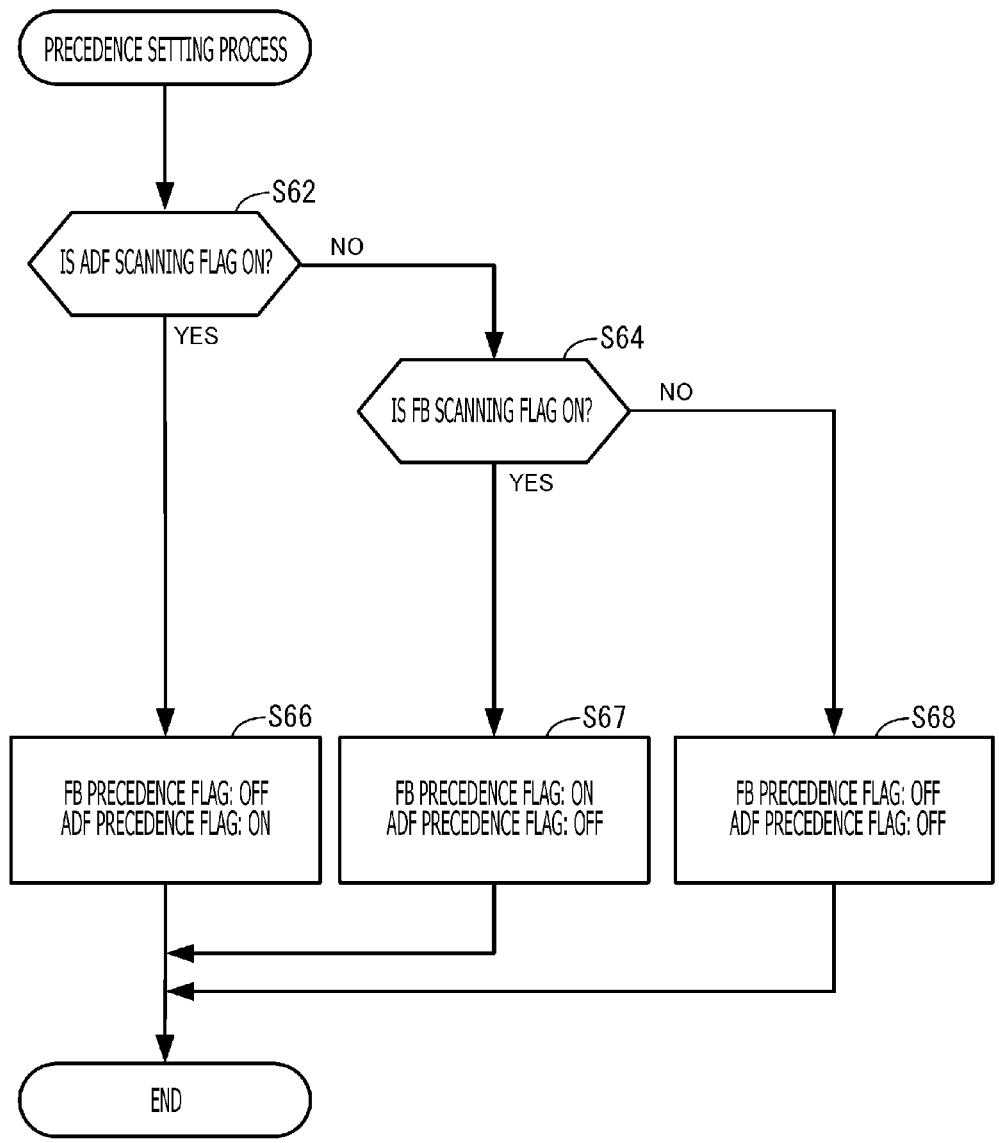
FIG. 9 is a flowchart illustrating a pre-decision process according to aspects of the invention.

According to the scan selection display process 3, the controller 50 firstly executes the precedence setting process (S60), and then proceeds to S222 (FIG. 8).

In S222, the controller 60 judges whether both the FB precedence flag and the ADF precedence flag are OFF, that is, the original sheets are set to the FB side and the ADF side simultaneously.

When the controller 50 judges that both the FB precedence flag and the ADF precedence flag are OFF (S222: YES), the controller 50 proceeds to S225. When the controller 50 judges that one of the FB precedence flag and the ADF precedence flag is ON (S222: NO), that is, when the original sheets are set to the ADF side earlier than the FB side, or set to the FB side earlier than the ADF side, the controller 50 proceeds to S224.

In S224, the controller 50 judges whether the ADF precedence flag is ON (i.e., the original sheets are set to the ADF side firstly).

When the controller 50 judges that the ADF precedence flag is ON (S224: YES), the controller 50 stores the selection information representing that the FB scanning items are selected in RAM 54 (S228), and terminates the scan selection display process.

When the controller 50 judges that the ADF precedence flag is OFF (S224: NO), the controller 50 stores the selection information representing that the FB scanning items are selected in RAM 54 (S229), and terminates the scan selection display process.

Steps S225, S226 and S227 are similar to those explained in the scan selection display process according to the first embodiment, and description thereof will be made in a simplified manner.

In S225, the controller 50 displays a selection display D4 (FIG. 4) which is referred to in S22 (FIG. 6) of the first embodiment. Thereafter, the controller 50 proceeds to S226.

In S226, the controller 50 judges whether the user has selected one of the FB scanning and the ADF scanning with the selection display D4, and the controller 50 has received the selection signal (i.e., whether the user has made a selection with the selection display D4). When the controller 50 judges that the selection signal has not been received (S226: NO), the controller 50 repeatedly executes S24 until a selection is made on the selection display D4. When the controller 50 has judges that the selection signal is received (S226: YES), the controller 50 proceeds to S227.

In S227, the controller 50 judges whether a signal representing selection of the FB scanning is received (i.e., whether the FB scanning is selected). When the controller 50 judges that the signal representing selection of the FB scanning is received (S227: YES), the controller 50 proceeds to S228. When the controller 50 judges that a signal representing selection of the FB scanning has not received (S227: NO), the controller 50 proceeds to S229.

<Precedence Setting Process>

In the precedence setting process (FIG. 9), the controller 50 firstly retrieves setting information regarding the ADF scanning from the RAM 54 and judges whether the ADF scanning flag is ON (S62). When the ADF scanning flag retrieved from the RAM in S64 is ON (S62: YES), the controller 50 sets "ON" to the ADF precedence flag, stores the same (S66) and terminates the precedence setting process.

The reason why judgment at S62 is necessary will be described. Assuming that the original sheets are set to the ADF side and the ADF scanning flag is set to ON at S34. Thereafter, when the original sheet is set to the FB side, the controller 50 proceeds from S40 to S2, then S4. In such a case, however, before the original sheet is set to the FB side and the FB scanning flag is set to ON, the scan selection display process at S20 is executed. Therefore, even if the cover sensor 66 is ON at S2, the FB scanning flag is not set to ON immediately. Therefore, when the scan selection display process at S20 is executed, the FB scanning flag remains OF even if the cover sensor 66 is turned ON at S2. Even if in such a condition, by referring to the ADF scanning flag at S62 of the precedence setting process, it can be judged that the original sheets has been set to the ADF side before set to the FB side.

When the ADF scanning flag retrieved from the RAM 54 in S62 is not ON (S62: NO), that is, when the ADF scanning flag is OFF, the controller 50 retrieves the setting information regarding the FB scanning from the RAM 54 and judges whether the FB scanning flag is ON (S64).

When the controller 50 judges that the FB scanning flag retrieved from the RAM 54 is ON (S64: YES), the controller 50 sets ON to the FB precedence flag, stores the same in the RAM 54 (S67) and terminates the precedence setting process. The reason why step S64 is executed is similar to the reason why step S62 is executed. That is, when the front sensor 18 is ON at S4 but the FB scanning flag remains to be ON, there could be a condition where the original sheets are set to the FB side firstly, and the FB scanning flag is set to ON in S36, and thereafter, the original sheets are set to the ADF side.

It is noted that, when the controller 50 judges that the FB scanning flag retrieved from the RAM 54 in S64 is not ON, that is, when both the FB scanning flag and the ADF scanning flag are OFF (S64: NO), the controller 50 sets OFF to both the FB precedence flag and the ADF precedence flag, stores the same in the RAM 54 (S68), and terminates the precedence decision process. Specifically, when both the ADF scanning flag and the FB scanning flag are OFF, it is assumed, for example, that the cover sensor 66 is ON in S2, the front sensor 18 is ON at S4, and steps S34 and S36 have not been executed.

According to the third embodiment, the controller 50 executes the precedence setting process in which the controller 50 determines to which of the FB side and the ADF side the original sheets are set firstly when the original sheets are set to both the FB side and the ADF side. Then, the controller 50 determines, based on the results of the precedence setting process, which of the first scanning unit 21 and the second scanning unit 22 is to be used and which of the ADF scanning and the FB scanning is to be executed. Specifically, the controller 50 prioritize one of the FB scanning item set and the ADF scanning item set with respect to the other when displaying, depending on the ON/OFF status of the FB precedence flag and the ADF precedence flag stored in the RAM 54. Therefore, the items are displayed on the display unit 9 with reflecting the timings at which the sheets are set to the FB side and the ADF side, and prioritizing, on the display unit 9, the selectable items corresponding to the selected scanning, which improves convenience for the user.

When the original sheets are set to both the FB side and the ADF side, it is likely that the user selects functions related to the scanning method corresponding to the lately set sheets. According to the third embodiment, when the sheets are set to both the FB side and the ADF side, the controller 50 judges which sheets set to the FB side and the ADF side have been set earlier by referring to the FB scanning flag and the ADF scanning flag, and set ON or OFF to the FB precedence flag and the ADF precedence flag. Thereafter, the controller 50 controls the first scanning unit 21 and/or the second scanning unit 22 in accordance with a scanning method corresponding to the lately set sheets, based on the FB precedence flag and the ADF precedence flag. That is, the controller 50 prioritizes the items corresponding to the lately set sheets when displaying the items on the display unit 9. Therefore, the user's intension can easily be reflected in displaying the items on the display.

<Modification of Third Embodiment>

According to a modification of the third embodiment which will be described hereafter, how the items are displayed on the display unit 9 is different from the above-described third embodiment.

According to the modification of the third embodiment, the controller 50 displays the ADF scanning items in more highlighted (or intensified) manner than the FB scanning items in S12 (FIG. 5) on the display unit 9. Specifically, the controller 50 displays the FB scanning items in accordance with a normal state on the display unit 9, while displays the ADF scanning items with use of thicker colors than the FB scanning items. The controller 50 proceeds to S40, then returns to S2 and executes the precedence setting process in S2. At this stage, when the ADF precedence flag is set to ON, then the controller 50 displays the FB scanning items on the display unit 9 in more highlighted or intensified manner than the ADF scanning items in S14.

According to the modification of the third embodiment, the controller 50 displays the FB scanning items in more highlighted (or intensified) manner than the ADF scanning items in S14 on the display unit 9. Specifically, the controller 50 displays the ADF scanning items in accordance with a normal state on the display unit 9, while displays the FB scanning items with use of thicker colors than the ADF scanning items. The controller 50 proceeds to S40, then returns to S2 and executes the precedence setting process in S2. At this stage, when the FB precedence flag is set to ON, then the controller 50 displays the ADF scanning items on the display unit 9 in more highlighted or intensified manner than the FB scanning items in S12.

As described above, according to the modification of the third embodiment, one of the ADF scanning items and the FD scanning items corresponding to the FB or ADF side to which the original sheets are set are displayed in more highlighted manner than the other. Therefore, the user can recognize selectable items regarding the scanning easily.

According to the modification of the third embodiment, the controller 50 displays the one of the ADF scanning item set and the FB scanning item set corresponding to the lately set sheets in more highlighter manner than the other, based on the FB precedence flag and the ADF precedence flag. Therefore, the user's intension can easily be reflected in displaying the items on the display.

<Fourth Embodiment>

A fourth embodiment will be described with reference to FIGS. 10-13. It is noted that a display switching process shown in FIG. 11 is similar to that of the first embodiment shown in FIG. 5 except for steps S10, S12 and S14. Steps similar to those shown in FIG. 5 are therefore omitted for brevity.

According to the fourth embodiment, the controller 50 arranges the ADF scanning items and the FD scanning items in a plurality of pages, which are displayed on the display unit 9 on page basis. Specifically, as shown in FIG. 10, a display D7 includes two pages of display items and includes both the ADF scanning items and the FB scanning items.

Figure 10:
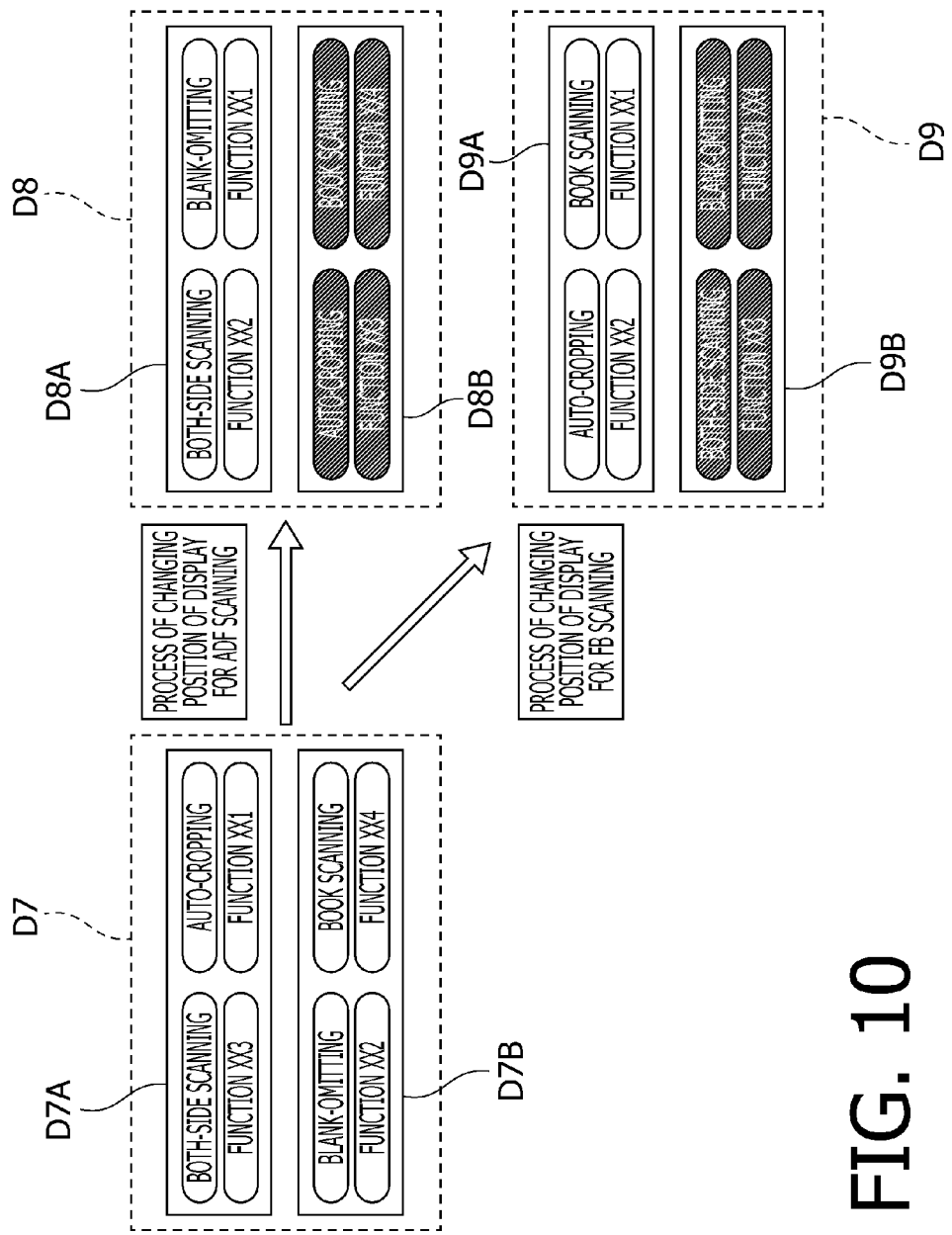
FIG. 10 is a chart showing transition of a status of a display unit according to a fourth embodiment of the invention.
Figure 11:
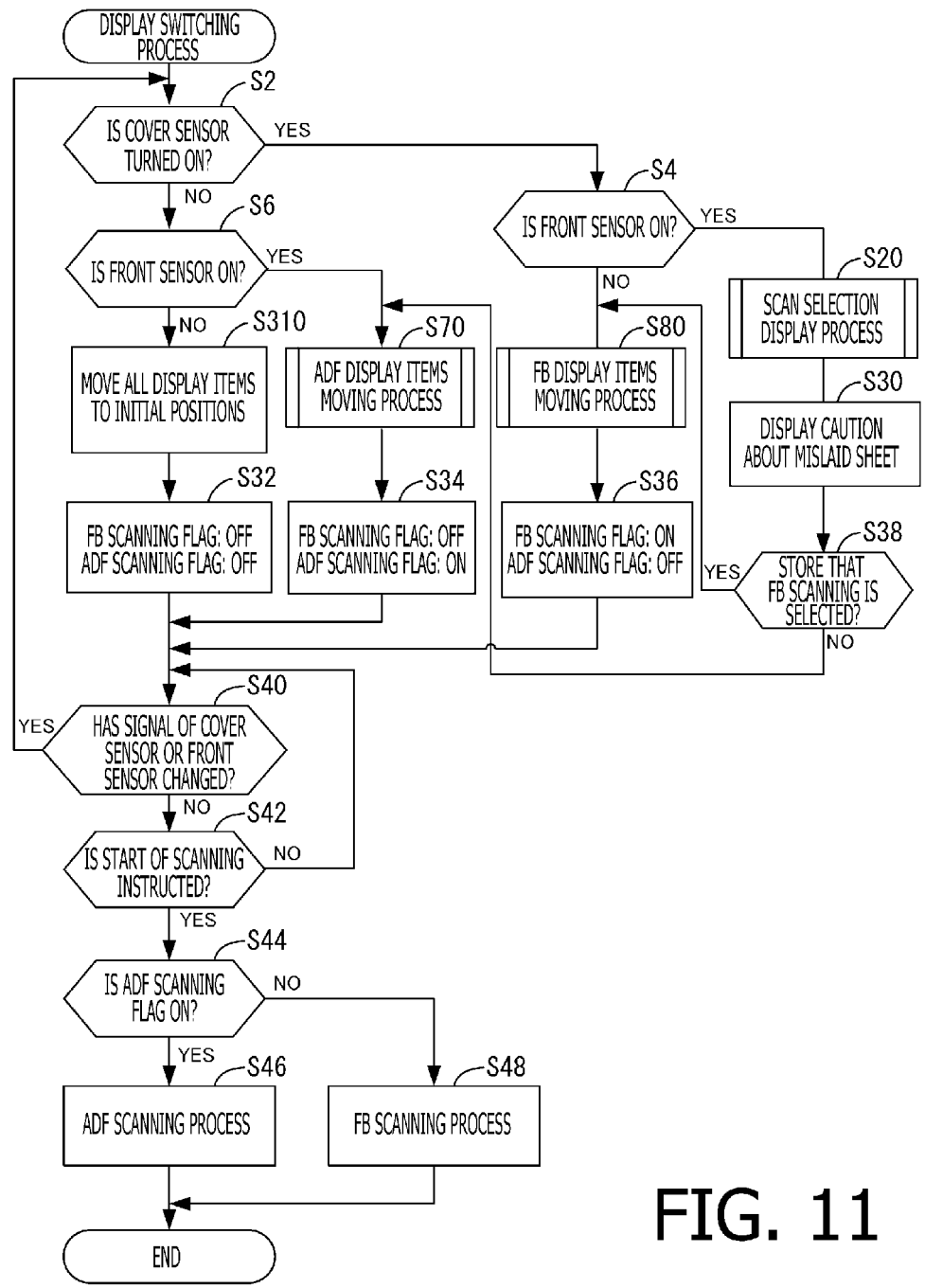
FIG. 11 is a flowchart illustrating a display switching process according to the fourth embodiment of the invention.
Figure 12:
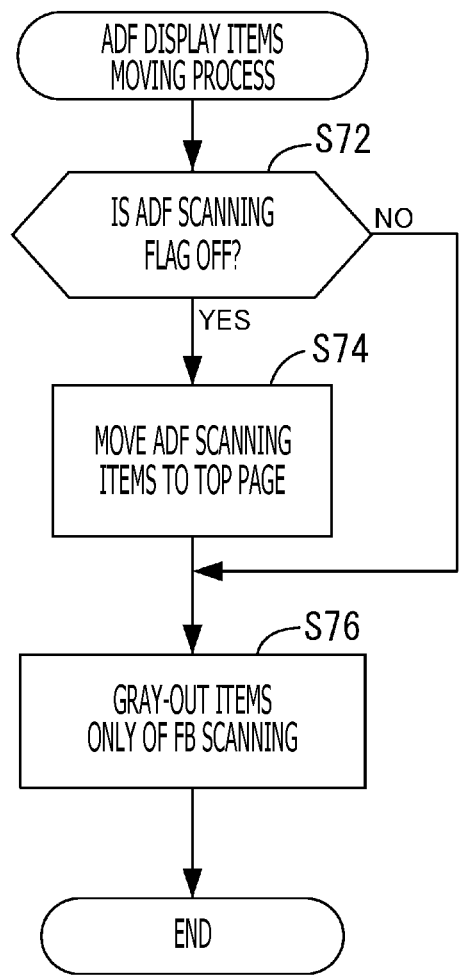
FIG. 12 is a flowchart illustrating an ADF display items moving process according to aspects of the invention.
Figure 13:
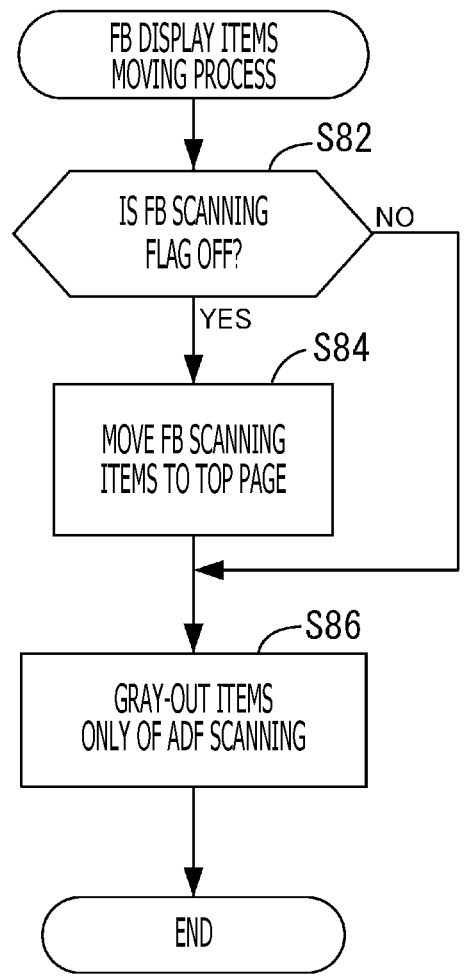
FIG. 13 is an FB display items moving process according to aspects of the invention.

In FIG. 10, a display D7 represents a normal display including all the items of the ADF scanning items and the FD scanning items. In the following description on the fourth embodiment, the display denoted by D7 will be referred to as a second initial display. According to the second initial display D7, items respectively representing a both-side scanning function, an auto-cropping function, a function XX1 and a function XX3 are arranged on a first page D7A, and items respectively representing a blank-omitting function, a book scanning function, a function XX2 and a function XX4 are arranged on a second page D7B. For example, one of the first page D7A and the second page D7B may be displayed on the display unit 9 at a time.

As shown in FIG. 11, the controller 50 executes an ADF display items moving process (S70) when the controller 50 judges that the front sensor 18 is ON (S6: YES), and proceeds to S34.

When the controller 50 judges that the front sensor is not ON (S6: NO), if arranged positions of the ADF scanning items and the FB scanning items have been changed from those of the second initial display D7, the ADF scanning items and the FD scanning items are returned to those of the second initial display D7 (S310) (i.e., the second initial display D7 is displayed on the display unit 9). Thereafter, the controller 50 proceeds to S32.

When the controller 50 judges that the front sensor 18 is not ON (S4: NO), an FB display items moving process is executed (S80) and proceeds to S36.

<ADF Display Items Moving Process>

In the ADF display items moving process (FIG. 12), the controller 50 retrieves the ADF scanning flag from the RAM 54 and judges whether the ADF scanning flag is OFF (i.e., the ADF scanning items are arranged on a plurality of pages on the display unit 9) (S72).

When the controller 50 judges that the ADF scanning flag is OF (S72: YES), which means that the ADF scanning items are arranged on a plurality of pages and displayed on the display unit 9. In this case, the controller 50 moves the ADF scanning items on the top page, displays the same on the display unit 9 (S74), and proceeds to S76. When the controller 50 judges that the ADF scanning flag is ON (S72: NO), the controller 50 proceeds to S76.

In S76, the controller 50 displays the FB-only item in grayed out manner (S76), and terminates the ADF display items moving process. Therefore, in S76, the display on the display unit 9 is changed from one denoted by D7 (FIG. 10) to a display D8.

The display D8 (FIG. 10) shows the items such that the ADF scanning items are moved to the top page, while the FB-only items are grayed out. The display D8 will be referred to as an ADF-leading display D8. In the ADF-leading display D8, the ADF-only functions such as both-scanning function, the blank-omitting function and the like are arranged on the first page D8A thereof, and the FB-only functions such as the auto-cropping function, the book scanning function and the like are arranged on the second page D8B.

<FB Display Items Moving Process>

In the FB display items moving process (FIG. 13), the controller 50 retrieves the FB scanning flag from the RAM 54 and judges whether the FB scanning flag is OFF (i.e., the FB scanning items are arranged on a plurality of pages on the display unit 9) (S82).

When the controller 50 judges that the FB scanning flag is OF (S82: YES), which means that the FB scanning items are arranged on a plurality of pages and displayed on the display unit 9. In this case, the controller 50 moves the FB scanning items on the top page, displays the same on the display unit 9 (S84), and proceeds to S86. When the controller 50 judges that the FB scanning flag is ON (S82: NO), the controller 50 proceeds to S86.

In S86, the controller 50 displays the ADF-only item in grayed out manner (S86), and terminates the ADF display items moving process. Therefore, in S86, the display on the display unit 9 is changed from one denoted by D7 (FIG. 10) to a display D9.

The display D9 (FIG. 10) shows the items such that the FB scanning items are moved to the top page, while the ADF-only items are grayed out. The display D9 will be referred to as an FB-leading display D9. In the FB-leading display D9, the FB-only functions such as auto-cropping function, the book scanning function and the like are arranged on the first page D9A thereof, and the ADF-only functions such as the both-side scanning function, the blank-omitting function and the like are arranged on the second page D9B.

According to the modification of the fourth embodiment, when the ADF scanning items and FB scanning items are arranged on two pages and displayed on the display unit 9, one of ADF scanning items and the FB scanning items to be prioritized are arranged on the first page. By arranging the selectable items for the scanning method to be executed, which are displayed on the first page of the display, the user can easily select the functions related to the scanning to be executed.

<Other Embodiments>

The technique disclosed in the specification should not be limited to ones described referring to the accompanying drawings, and could include various modifications without departing from the scope of the invention.

According to the above embodiments and modifications, the display unit employs a touch panel to acquire user operations. However, the invention need not be limited to such a configuration. For example, hard keys arranged next to the display unit may be employed so that the user can select one of the displayed items by operating the hard keys.

In the above-described embodiments and modifications, a grayed out display is described as a display providing a low visibility. It is possible to employ other configurations to provide the lower visibility. For example, when the FB scanning items or the ADF scanning items are displayed using a color closer to the background color to provide the low visibility. Alternatively, a color having a low thickness may be used to provide the low visibility.

In the above-described embodiments and modifications, the front sensor is employed to judge whether the original sheets are set to the ADF side. Alternatively or optionally, another sensor may be provided to the sheet conveying unit. In such a case, using such an extra sensor, absence/presence of the sheets on the sheet supply tray may be detected. Further optionally, absence/presence of the sheets on both the FB side and the ADF side may be detected with such an extra sensor.

In the above-described embodiments and modifications, the cover sensor is employed to judge whether the sheets are set to the FB side. Alternatively or optionally, another sensor may be provided to the sheet conveying unit or scanning unit. In such a case, absence/presence of the sheets on the first platen glass may be detected with such an extra sensor. Further optionally, absence/presence of the sheets on both the FB side and the ADF side may be detected with such an extra sensor.

In the above-described embodiments and modifications, based on whether the detection signal from the cover sensor or the front sensor has been changed or not, it is judged whether the setting status of the original sheets on the ADF side or the FB side has been changed (S40). It may be modified such that whether the setting status of the original sheets at the ADF side or the FB side has been changed may be judged based on the detection signal from the front sensor.

In the above-described embodiments and modifications, the display switching process may be executed only by a plurality of CPUs (central processing units), only by hardware (circuits) including ASIC (application specific integrated circuit), or both the CPUs and the hard circuits.

What is claimed is:

1. A scanning device, comprising:
   a sheet tray configured to hold sheets;
   a conveying unit configured to convey the sheet held by the sheet tray;
   a scanning unit configured to scan an image on a sheet;
   a sheet table configured to hold a sheet placed thereon;
   a display unit;
   a controller configured to:
      judge whether the scanning device is to be operated in a conveyed sheet scanning mode in which the controller controls the conveying unit to convey the sheet and control the scanning unit to scan images on the sheet being conveyed, or in a held sheet scanning mode in which the sheet stationarily held by the sheet table is scanned;
      display functions related to the conveyed sheet scanning mode on the display unit in a first prioritized manner over functions related to the held sheet scanning mode when the controller judges that the scanning device is to be operated in the conveyed sheet scanning mode; and
      display functions related to the held sheet scanning mode on the display unit in a second prioritized manner over functions related to the conveyed sheet scanning mode when the controller judges that the scanning device is to be operated in the held sheet scanning mode;
      lower visibility of the functions related to the held sheet scanning mode than the visibility of the functions related to the conveyed sheet scanning mode when the functions are displayed in the first prioritized manner; and
      lower visibility of the functions related to the conveyed sheet scanning mode than the visibility of the functions related to the held sheet scanning mode when the functions are displayed in the second prioritized manner.

2. The scanning device according to claim 1, wherein the controller is further configured to display the functions related to both the conveyed sheet scanning mode and the held sheet scanning mode in a manner different from the first prioritized manner or the second prioritized manner when the sheets are held both by the sheet tray and the sheet table.

3. The scanning device according to claim 2, wherein the controller is further configured to:

judge which of holding of the sheet by the sheet tray and holding of the sheet by the sheet table occurred earlier when the sheets are held both by the sheet tray and the sheet table;

determine that the scanning device is to be operated in the conveyed sheet scanning mode when the controller judges that holding of the sheet by the sheet table occurred earlier than holding of the sheet by the sheet tray; and determine that the scanning device is to be operated in the held sheet scanning mode when the controller judges that holding of the sheet by the sheet tray occurred earlier than holding of the sheet by the sheet table.

4. The scanning device according to claim 3, further comprising:

a tray sensor configured to detect presence/absence of the sheet held by the sheet tray;

a sheet table cover configured to be openable/closable with respect to the sheet table, the sheet table cover covering the sheet table when closed;

a cover sensor configured to detect an open/close state of the sheet table cover; and a storage device, wherein the controller is further configured to:

judge whether the sheet is held by the sheet tray with use of the tray sensor;

store first information indicating that the sheet is held by the sheet tray in the storage when the controller judges that the sheet is held by the sheet tray;

judge whether the sheet table cover is in an open state with use of the cover sensor before the scanning unit scans the sheet;

store second information indicating that the sheet is held by the sheet table in the storage when the controller judges that the sheet cover is in the open state before the scanning unit scans the sheet;

determine that the scanning device is to be operated in the conveyed sheet scanning mode when the first information is stored in the storage; and determine that the scanning device is to be operated in the held sheet scanning mode when the second information is stored in the storage.

5. The scanning device according to claim 2, further comprising an interface receiving a user operation to items displayed on the display unit, wherein the controller is further configured to:

display, on the display unit, selectable items respectively corresponding to the conveyed sheet scanning mode and the held sheet scanning mode when the sheets are held by both the sheet tray and the sheet table; and determine one of the conveyed scanning mode and the held scanning mode to be used based on the user operation to the selectable items displayed on the display unit and acquired through the interface.

6. The scanning device according to claim 2, wherein the controller is further configured to:

initially display the functions related to both the conveyed sheet scanning mode and the held sheet scanning mode none of in the first prioritized manner and the second prioritized manner;

determine that the scanning device is to be operated in the conveyed sheet scanning mode when a function related only to the conveyed scanning mode is selected; and determine that the scanning device is to be operated in the held sheet scanning mode when a function related only to the held scanning mode is selected.

7. The scanning device according to claim 1, further comprising an interface receiving a user operation to the functions displayed on the display unit, wherein the controller is further configured to:

wherein the controller is further configured to:

change the visibility of the functions related to the conveyed sheet scanning mode to become higher than the visibility of the functions related to the held sheet scanning mode when a function related to the conveyed sheet scanning mode is selected through the interface when the visibility of the functions related to the conveyed sheet scanning mode is lower than the visibility of the functions related to the held sheet scanning mode; and change the visibility of the functions related to the held sheet scanning mode to become higher than the visibility of the functions related to the conveyed sheet scanning mode when a function related to the held sheet scanning mode is selected through the interface when the visibility of the functions related to the held sheet scanning mode is lower than the visibility of the functions related to the conveyed sheet scanning mode.

8. The scanning device according to claim 1, wherein the controller is further configured to:

display the functions related to the conveyed sheet scanning mode in more highlighted manner than the functions related to the held sheet scanning mode when the functions are displayed in the first prioritized manner; and display the functions related to the held sheet scanning mode in more highlighted manner than the functions related to the conveyed sheet scanning mode when the functions are displayed in the second prioritized manner.

9. The scanning device according to claim 8, wherein the controller is further configured to:

judge which of holding of the sheet by the sheet tray and holding of the sheet by the sheet table occurred earlier when the sheets are held both by the sheet tray and the sheet table;

display the functions related to the conveyed sheet scanning mode in more highlighted manner than the functions related to the held sheet scanning mode when the controller judges that holding of the sheet by the sheet table occurred earlier than holding of the sheet by the sheet tray; and display the functions related to the held sheet scanning mode in more highlighted manner than the functions related to the conveyed sheet scanning mode when the controller judges that holding of the sheet by the sheet tray occurred earlier than holding of the sheet by the sheet table.

10. The scanning device according to claim 1, wherein the functions included in both the conveyed sheet scanning mode and the held sheet scanning mode are arranged on a plurality of pages on the display unit, wherein the controller is further configured to:

display the functions related to the conveyed sheet scanning mode on a top page of the plurality of pages when the functions are displayed in the first prioritized manner; and display the functions related to the held sheet scanning mode in more highlighted manner than the functions related to the conveyed sheet scanning mode when the functions are displayed in the second prioritized manner.

* * * * *